United States Patent [19]
Gobeille

[11] 3,772,928
[45] Nov. 20, 1973

[54] COMPOSITE V-BELT PULLEY AND METHOD
[76] Inventor: William P. Gobeille, Farmington, Mich.
[22] Filed: June 7, 1972
[21] Appl. No.: 260,378

[52] U.S. Cl. ............................. 74/230.7, 29/159 R
[51] Int. Cl. ...................... F16h 55/48, B21d 53/26
[58] Field of Search ..................... 74/230.7, 230.14; 29/159 R

[56] References Cited
UNITED STATES PATENTS
3,592,511  7/1971  Hudelson ...................... 74/230.7 X
3,469,468  9/1969  Cozzarin et al. .................. 74/439 X
3,557,424  1/1971  Heathwaite et al. ............... 74/439 X Primary Examiner—Leonard H. Gerin
Attorney—J. King Harness et al.

[57] ABSTRACT

A novel composite V-belt pulley construction for use with automotive V-belts and the like; and, a novel method of manufacturing the composite V-belt pulley.

5 Claims, 6 Drawing Figures

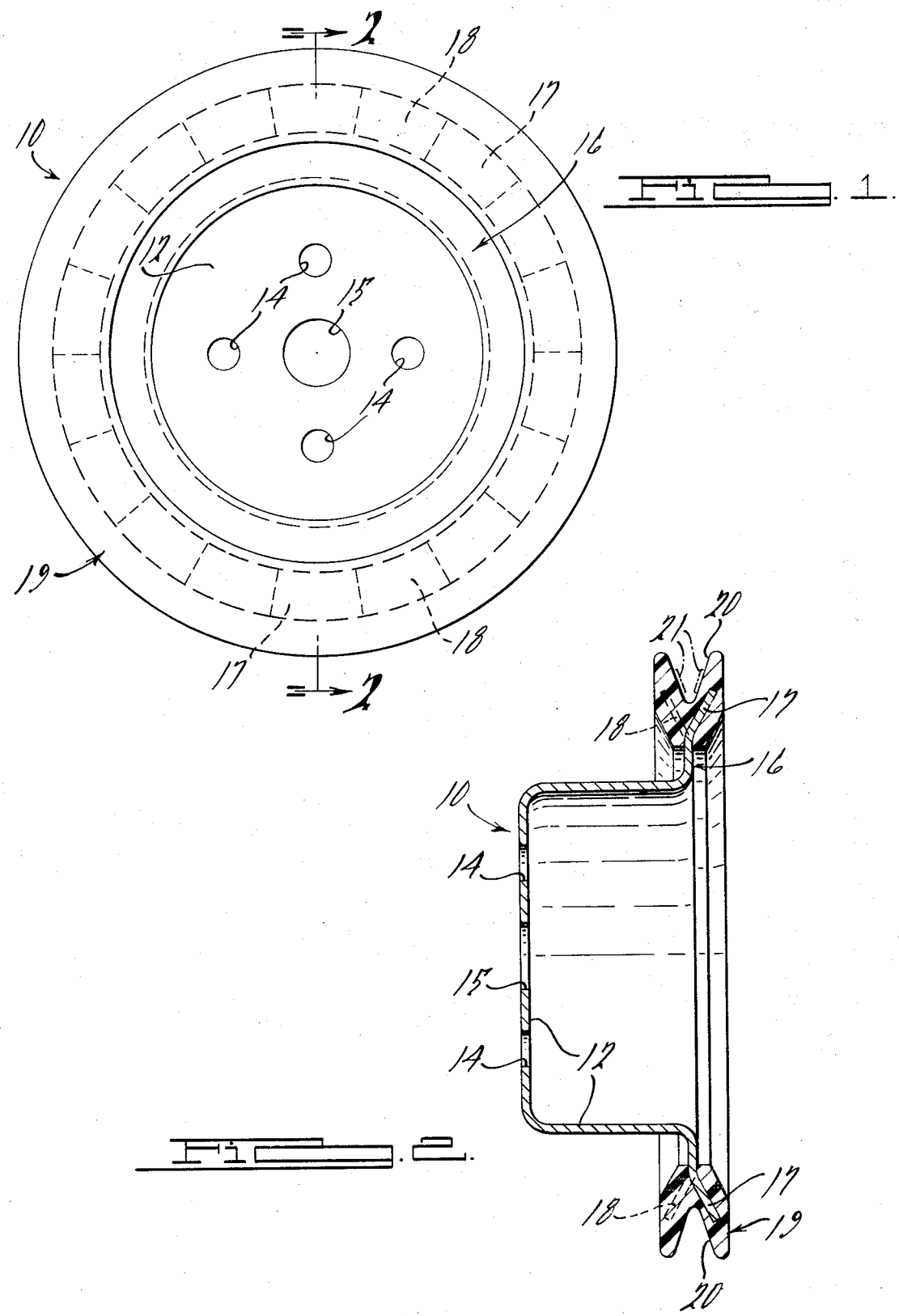

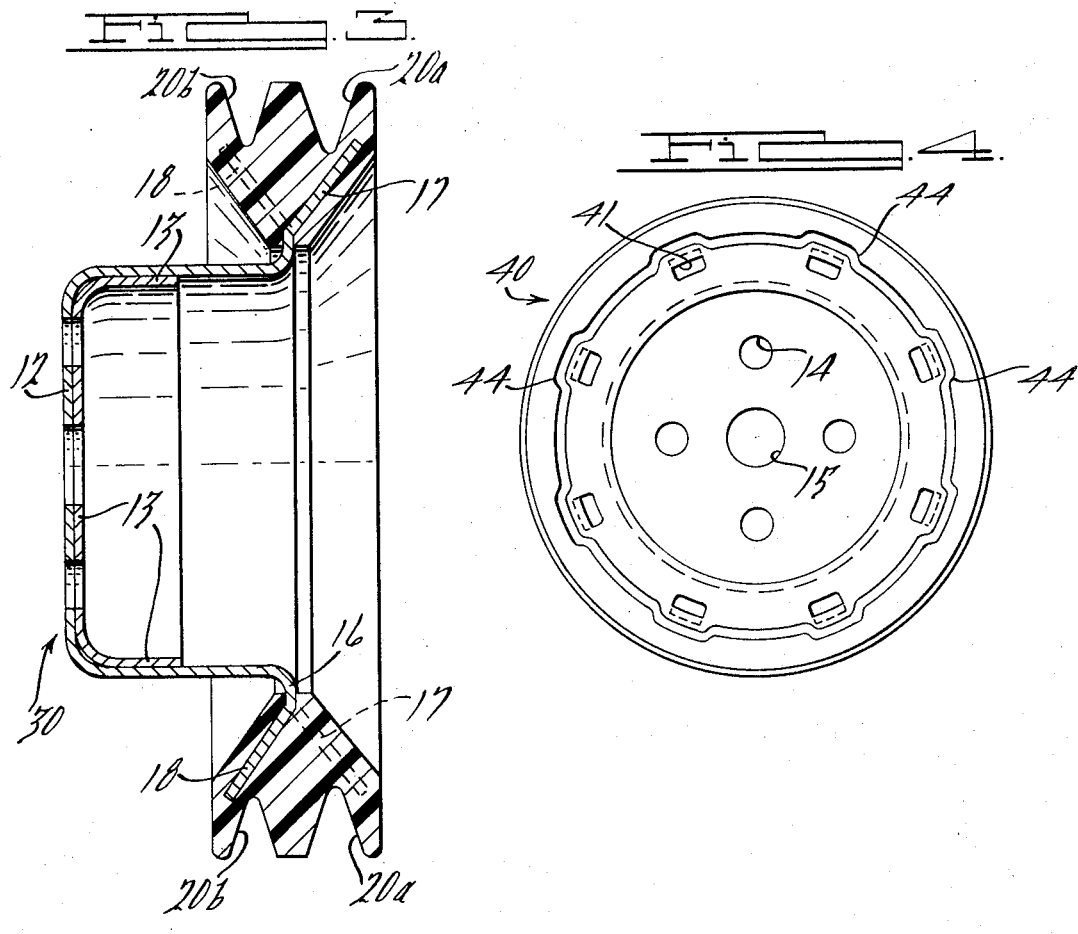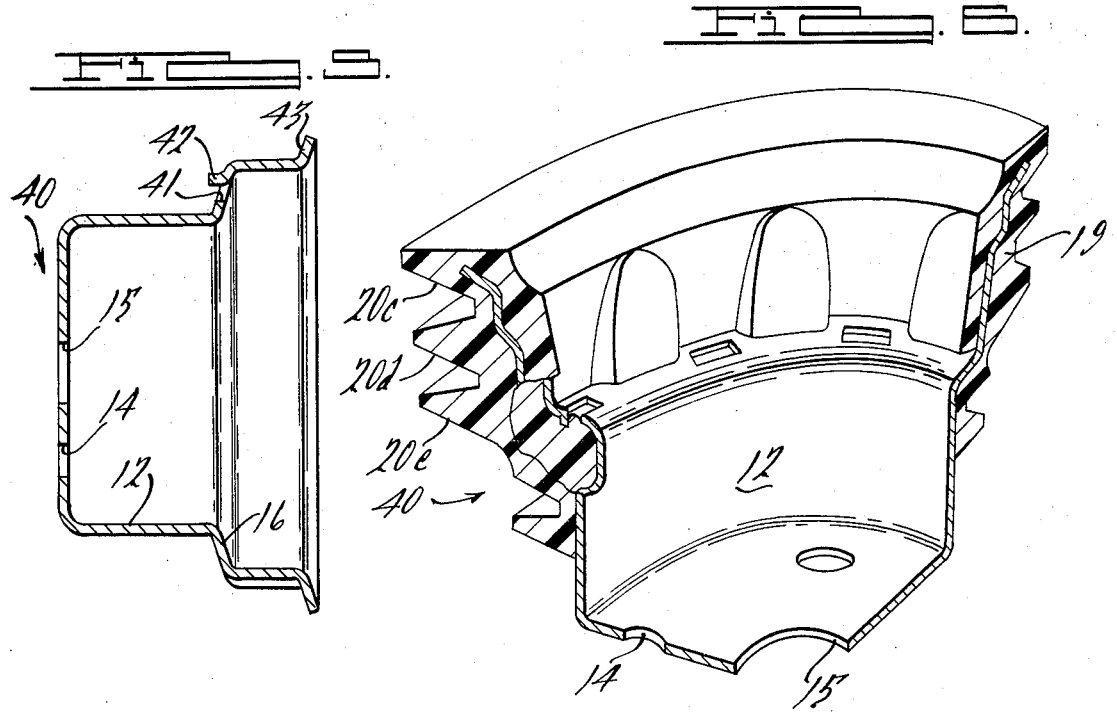

COMPOSITE V-BELT PULLEY AND METHOD

BACKGROUND OF THE INVENTION

This invention broadly relates to a new composite V-belt pulley construction particularly suitable for use in the automotive field and to the method of manufacturing same.

Prior V-belt pulleys in the automotive field have been usually of an all metal construction. In order to manufacture these prior all metal V-belt pulleys, it has been necessary to carry out numerous operations such as casting or forging of metal blanks with many subsequent machining operations or by forming from sheet with at least one final spinning operation wherein one or more V-belt seating grooves are formed in the all metal pulley. Accordingly, there has long been a need in the art for a more economical or better V-belt pulley construction.

Accordingly a primary object of this invention is to provide a new and improved V-belt pulley construction.

Another object of the present invention is to provide a new method of manufacturing V-belt pulleys suitable for use in the automotive field.

Another object of the present invention is to provide a new method of manufacturing V-belt pulleys suitable for use in the automotive field which is more economical than prior known techniques of manufacturing V-belt pulleys.

Another object of the present invention is to provide a new V-belt pulley construction which is lighter in weight, quieter in operation, runs cooler, and costs less than previously known V-belt pulley constructions.

Other objects, features, and advantages of the present invention will become apparent from the subsequent description and the appended claims taken in conjunction with the accompanying drawings.

BRIEF DESCRIPTION OF THE DRAWINGS

FIG. 1 illustrates one embodiment of a composite V-belt pulley in accordance with the invention;

FIG. 2 illustrates a cross sectional view taken along the line 2—2 in FIG. 1;

FIG. 3 illustrates another embodiment of the invention in cross sectional view;

FIGS. 4, 5, and 6 illustrate still another embodiment of the invention, with FIG. 5 being a cross sectional view taken along line 5—5 of FIG. 4.

SUMMARY OF THE INVENTION

Previous all metal pulleys are difficult and expensive to manufacture. On the other hand "all plastic" pulley constructions have been attempted and found unsuitable because of improper strength requirements and unsatisfactory distortion resistance under operating conditions. However, it has now been discovered that a composite V-belt pulley can be constructed, after numerous unsuccessful attempts, in accordance with the inventive disclosure taught herein. The advantages of this invention are believed to provide this new pulley construction with highly significant commercial utility in the automotive industry.

Briefly stated, in one aspect, the present invention comprises a composite pulley construction for use with an automotive V-belt and the like, comprising, metal hub means for mounting the pulley for rotation, said metal hub means including, peripheral portion means operative to receive and support a molded plastic sheave means containing a circular groove operative to receive the belt therein, said plastic sheave means being molded over the peripheral portion means in a fixed relationship therewith.

The plastic sheave means referred to above is formed of a high temperature resistant, distortion resistant, plastic material which has a belt contacting surface means of relatively high coefficient of friction to resist slippage between the belt and the pulley. Mechanical projection means are formed on the peripheral portion of the metal hub to cause interlocking and to assist in preventing any relative rotation between the plastic sheave and the metal hub of the pulley.

The plastic sheave means is also preferably made of a plastic reinforced with filler means for providing added strength and distortion resistance to the plastic sheave. The plastic sheave is preferably made or molded from a material selected from at least one of the group consisting of a fiberglass plastic, a thermoset plastic material, or nylon. Most suitable results in accordance with the invention discovered and disclosed herein are obtained with either nylon or a fiberglass plastic to form the plastic sheave.

From a method aspect, the invention herein involves the discovery of a method of manufacturing a composite pulley construction for use with an automotive V-belt and the like, comprising the steps of: stamping from metal stock a metal hub means which includes mounting means for the pulley, a peripheral portion means for receiving a plastic sheave means, and mechanical projection means, injection molding a plastic sheave means over the peripheral portion means in a fixed relationship therewith, said mechanical projection means on the peripheral portion of the hub means being operative to assist in preventing relative rotation between the plastic sheave and the hub means.

The method of the invention may also advantageously include the step of treating the metal hub subsequent to the stamping thereof with a material such as a corrosion resistant paint or a treatment solution to provide the metal with corrosion resistance.

DESCRIPTION OF PREFERRED EMBODIMENTS

Looking now to the drawing figures, the composite V-belt pulley 10 of FIGS. 1-2 is comprised of a metal hub means 12 in which are positioned one or more apertures or mounting holes 14 and a central mounting hole 15. The metal hub 12 also includes a peripheral flange or peripheral portion means designated 16 with the peripheral flange 16 having a portion thereof stamped into back and forth alternating tabs, with the tabs oriented to the right as viewed in FIG. 2 being designated 17 and those to the left being designated 18. The metal hub means 12 including the peripheral portion 16 and tabs 17, 18 extending therefrom in accordance with this invention are formed in a metal stamping operation.

An injection molded plastic sheave designated 19 is molded over the peripheral portion 16 and the alternately right and left hand oriented tabs 17, 18 to define a sheave which includes a circular, generally V-shaped groove 20 which receives the V-belt (not shown) of the automotive vehicle. The plastic sheave 19 is uniquely formed by injection molding a high temperature resistant, distortion resistant, plastic material over the peripheral flange 16 and the tabs 17, 18 of the metal hub 12. The molded plastic sheave so formed has been found to possess a belt contacting surface of relatively high coefficient of friction to resist slippage between the belt and the pulley. As optionally shown in the groove 20 of FIGS. 1 and 2, there may also be molded into the plastic sheave a plurality of gripping means designated 21. However, the gripping means 21 are not necessary to proper functioning of the composite V-belt pulley in accordance with this invention.

It has been discovered in accordance with the invention that the plastic sheave should be molded from a material selected from at least one of the group consisting of a fiberglass plastic, a thermoset plastic, or nylon. Preferred results in accordance with the invention, are obtained when the plastic sheave is made from either a fiberglass plastic or nylon, and best results appear to be obtained with a glass filled nylon molded material. By the term plastic as used herein it is meant in its broadest sense to include those plastics which will function to provide a high temperature resistant, distortion resistant, plastic material which is capable of providing a belt contacting surface means of sufficiently high coefficient of friction to resist slippage between the belt and the pulley; and, certain hard rubbery materials may be suitable for this purpose and are included within the term plastic.

FIG. 3 illustrates another embodiment of the invention where the alternating right hand, left hand orientation of tabs 17, 18 support a plastic sheave which has a pair of V-belt grooves designated 20a and 20b. The composite V-belt pulley construction 30 in FIG. 3 also includes a metal member 13 which acts to additionally reinforce the metal hub 12.

FIGS. 4, 5, and 6 illustrate another embodiment of the composite V-belt pulley construction in accordance with this invention designated 40. The pulley construction 40 is comprised of metal hub means 12 and peripheral flange portion means 16 shaped in a manner such that it is adapted to support an injection molded plastic sheave which contains a plurality of V-belt grooves designated 20c, 20d, and 20e. It is to be noted that the injection molded plastic sheave 19 in the embodiment of FIGS. 4-6 has additional interlocking support provided between the sheave and the flange portion 16 because the plastic actually flows through the punched or pierced slots designated 41 and the extended tabs 42 formed from the metal which is displaced from the slots 41. The interlocking support between the flange portion 16 and the plastic sheave 19 is additionally enhanced by the enveloping of the molded plastic sheave over the outer bent rim portion 43, and also due to the mechanical interlock formed between the plastic sheave 19 and the humps or projections 44. Thus it should be appreciated that the elements 41, 42, 43, and 44 (present as extensions of the flange portion 16) all act to cause interlocking and to assist in preventing any relative rotation between the plastic sheave 19 and the metal hub 12. The elements 41, 42, 43, and 44 are formed in the metal stamping operation as described hereinabove.

THE ADVANTAGES OF THE INVENTION

The advantages of the invention should be fairly apparent from the description above, however, certain specific advantages discovered in accordance with this invention are as follows. First, the composite V-belt pulley of this invention has been discovered to transmit more horsepower at high loadings because there is less slippage between the belt and the pulley because of the higher coefficient of friction on the surface of the plastic sheave relative to prior all metal pulleys. Second, the pulley construction of this invention allows the metal portion of the pulley to be stamped into its proper shape in an easy economical manner, subsequent to which the plastic sheave is injection molded over the metal hub. This has been discovered to be a distinct advantage relative to the prior technique of having to form and spin or otherwise fabricate the metal into its final shape as in prior all metal pulleys. Third, it has been discovered that by molding the plastic sheave over the metal hub means in accordance with this invention there is an improved and more constant repeatability in achieving true roundness in the sheave, that is a truer round is obtained in the sheave area or circular groove than is possible with an all metal pulley. The truer round is obtained with the pulley construction of this invention because the molded plastic sheave is inherently balanced whereas this is not so with an all metal pulley where the greatest part of the weight is at the periphery of the metal pulley and as a result of this there is a greater tendency for the all metal pulley to be out of balance. Fourth, the pulley construction of this invention is lighter in weight than prior pulley constructions. Fifth, the pulley construction of this invention has been discovered to be quieter in operation. Sixth, the pulley construction disclosed herein runs cooler than prior all metal pulley constructions and this is a decided advantage in automotive vehicular use because it leads to longer belt life and belt wear. Sixth, the pulley construction of this invention is more economical to produce than prior all metal pulley constructions. Seventh, with the pulley construction of this invention it is possible to provide indentations or gripping serrations or the like molded into the plastic sheave in the belt contacting surface layer thereof, whereas this has not been possible in prior all metal pulley constructions because of the final spinning operation used to prepare the V-belt grooves therein. Eighth, it has been found that with the pulley construction of this invention there is little if any susceptibility to corrosion, erosion, or pitting in the plastic V-groove track, whereas in prior all metal pulley constructions the V-groove surface area has been readily susceptible to corrosion and pitting. Ninth, it has been discovered that the method of manufacturing the pulley construction in accordance with this invention is unique and easy to carry out in comparison with prior art methods of preparing all metal pulleys because in those prior art techniques it was necessary to cast or forge and machine or form and anneal the metal several times coupled with a high speed final spinning operation wherein the belt seating groove was formed; and, the technique of manufacturing the pulley construction in accordance with this invention is considerably more feasible to carry out, requiring less steps to reach the final product and the final product so produced in accordance with this invention possesses numerous advantages over prior known pulleys.

While it will be apparent that the preferred embodiments of the invention disclosed are well calculated to fulfill the objects above stated, it will be appreciated that the invention is susceptible to modification, variation, and change without departing from the proper scope or fair meaning of the subjoined claims.

What is claimed is:

1. An automotive V-belt pulley construction, comprising, metal hub means with a plurality of mounting holes in a single plane thereof for mounting the pulley for rotation,
said metal hub means including,
peripheral portion means operative to receive and support a molded plastic sheave means containing a
circular V-belt groove operative to receive the belt therein,
said plastic sheave means being molded over the peripheral portion means in a fixed relationship therewith,
mechanical projection means being present on the peripheral portion means to cause interlocking and to assist in preventing any relative rotation between the plastic sheave and the hub means,
said mechanical projection means being shaped to receive and not interfere with the V-belt groove in said plastic sheave,
said plastic sheave means being formed of a high temperature
resistant, distortion resistant, plastic material which has
a belt contacting surface means of relatively high coefficient of friction to resist slippage between the belt and the pulley,
said plastic sheave means being made of a material selected
from at least one of the group consisting of a fiberglass plastic, a thermoset plastic, or nylon, and
wherein said plane of the mounting holes is significantly laterally offset from a circular plane formed by the V-belt groove.

2. The pulley construction of claim 1 wherein,
said plastic sheave means is made of a plastic reinforced with
filler means for providing added strength and distortion resistance to the plastic sheave.

3. The pulley construction of claim 1 wherein,
a plurality of circular grooves are located in the plastic sheave means operative to receive a plurality of said belts therein.

4. A method of manufacturing a composite pulley construction for use with an automotive V-belt and the like, comprising the steps of:
stamping from metal stock a metal hub means which includes
mounting means for the pulley, a peripheral portion means for receiving a plastic sheave means, and mechanical projection means,
treating the metal hub subsequent to stamping thereof with a material means from the group consisting of paint or a treatment solution to provide the metal with corrosion resistance,
injection molding a plastic sheave means over the peripheral portion means in a fixed relationship therewith,
said mechanical projection means on the peripheral portion of the hub means being operative to assist in preventing relative rotation between the plastic sheave and the hub means.

5. The method of claim 4 further including,
gripping means formed in the belt contacting surface of the plastic sheave means during molding thereof for providing additional slippage resistance between the belt and the pulley.

* * * * *